(12) United States Patent
Tumagyan et al.

(10) Patent No.: US 9,894,916 B2
(45) Date of Patent: Feb. 20, 2018

(54) DEVICE FOR PROCESSING CROP RESIDUE INTO NUTRITIONAL PRODUCTS

(71) Applicants: Ashot Tumagyan, Albuquerque, NM (US); Hakob Sargsyan, Yerevan (AM); Roza Madoyan, Yerevan (AM)

(72) Inventors: Ashot Tumagyan, Albuquerque, NM (US); Hakob Sargsyan, Yerevan (AM); Roza Madoyan, Yerevan (AM)

( * ) Notice: Subject to any disclaimer, the term of this patent is extended or adjusted under 35 U.S.C. 154(b) by 0 days.

(21) Appl. No.: 14/277,236

(22) Filed: May 14, 2014

(65) Prior Publication Data

US 2016/0037803 A1 Feb. 11, 2016

(51) Int. Cl.
| | | |
|---|---|---|
| *B29C 47/12* | (2006.01) | |
| *B29C 47/60* | (2006.01) | |
| *B29C 47/66* | (2006.01) | |
| *A23K 1/14* | (2006.01) | |
| *B29C 47/08* | (2006.01) | |
| *A23K 40/25* | (2016.01) | |
| *A23N 17/00* | (2006.01) | |
| *C12G 3/02* | (2006.01) | |
| *A23K 40/20* | (2016.01) | |

(Continued)

(52) U.S. Cl.
CPC .............. *A23K 1/146* (2013.01); *A23K 10/16* (2016.05); *A23K 10/18* (2016.05); *A23K 10/37* (2016.05); *A23K 40/20* (2016.05); *A23K 40/25* (2016.05); *A23K 50/10* (2016.05); *A23N 17/005* (2013.01); *A23P 10/40* (2016.08); *A23P 30/20* (2016.08); *B29C 47/0813* (2013.01); *B29C 47/0816* (2013.01); *B29C 47/122* (2013.01); *B29C 47/6025* (2013.01); *B29C 47/666* (2013.01); *C12G 3/02* (2013.01); *A23V 2002/00* (2013.01); *Y02P 60/877* (2015.11)

(58) Field of Classification Search
CPC .... A23K 40/20; A23K 40/25; B29C 47/0813; B29C 47/0816; B29C 47/122; B29C 47/385; B29C 47/6025; B29C 47/661; B29C 47/666
See application file for complete search history.

(56) References Cited

U.S. PATENT DOCUMENTS

| | | | |
|---|---|---|---|
| 4,243,686 A | 1/1981 | Israiledes | |
| 5,213,026 A * | 5/1993 | House | A23N 17/00 366/319 |

(Continued)

*Primary Examiner* — Alison L Hindenlang
*Assistant Examiner* — Joseph Leyson
(74) *Attorney, Agent, or Firm* — Charles C. McCloskey (57) ABSTRACT

A pressure device has a rifled barrel, a rifled end cap, a section clamped to the barrel, a circular flange welded to a threaded male pipe connection, a plate with holes or a cone, a female cap receiving the plate and aligning the holes to the rifling in the barrel, and the flange threadily engaging the cap, securing the plate. The rifled barrel provides shearing, increased pressure, and higher temperatures upon the passing crop residue. The increased surface area of the rifling grooves increases temperature and pressure between the crop residue and the barrel wall. The rifling, when misaligned, creates a pressure chamber that further breaks down the molecules in the crop residue. The crop residue then enters a popper device. The pressure in the popper device forces the crop residue through the holes of plate or around an encased cone, relieving excess pressure and producing a nutritional animal feed.

11 Claims, 5 Drawing Sheets

(51) Int. Cl.
 *A23K 10/16* (2016.01)
 *A23K 10/18* (2016.01)
 *A23K 10/37* (2016.01)
 *A23K 50/10* (2016.01)
 *A23P 10/40* (2016.01)
 *A23P 30/20* (2016.01)

(56) References Cited

U.S. PATENT DOCUMENTS

| | | |
|---|---|---|
| 5,622,037 A | 4/1997 | Haimer |
| 5,622,744 A * | 4/1997 | Matson .................. A23K 40/20 426/440 |
| 8,322,272 B1 | 12/2012 | Wegner |
| 2006/0201641 A1 | 9/2006 | Harris |
| 2008/0233244 A1 | 9/2008 | Swenson |
| 2011/0081336 A1 | 4/2011 | Medoff |

* cited by examiner

DEVICE FOR PROCESSING CROP RESIDUE INTO NUTRITIONAL PRODUCTS

CROSS-REFERENCE TO RELATED APPLICATION

This U.S. non-provisional application is a continuation of PCT application having Serial No. PCT/US2013/000040, which was filed on Feb. 20, 2013, and these applications are all owned by the same inventors.

BACKGROUND OF THE INVENTION

The apparatus and method for processing crop residue into more nutritional products generally relates to implements and more specifically to a pressure device that processes agricultural residue.

Since 1980 there have been at least 24 international conferences and workshops in Africa and Asia to consider research and development on crop residues as feed with emphasis on improving their intake and digestibility in ruminant animals. Little practical application has occurred because of difficulties in transporting and storing crop residues and insufficient demonstration of economic benefits from treatment and supplementation. However, as populations increases and the demand for food increases there will be increasing pressure to find ways to balance crop production and animal husbandry.

Crop residue is typically high in fiber (lignocellulosic cell wall constituents) and low in crude protein and energy. It is also not a perfectly homogenous forage. It is mainly composed of cellulose (35-50%), hemicellulose (15-30%), lignin (20-30%), nitrogenous compounds and ash. The exact composition depends on the type and variety of crop residue. Even though crop residue contains enough cellulose to make it an excellent source of dietary energy to ruminates, it is a poor quality feed in its natural state because of low digestibility and protein content, poor palatability and bulkiness.

The search for ways of adding nutritional value to cereal crop residue dates back to the 1930 and 1940's in Germany. During WWI fodder shortages due to the war lead to the development of the Beckmann Method which was practiced on farms to improve the digestibility and intake of crop residue. The Beckmann Method is a practical method of treating crop residue with NaOH and is recognized as a technically viable means of upgrading the feed value of crop residue. The process involves soaking the crop residue in 1.5% solution of NaOH solution at atmospheric temperature and pressure, then draining and washing the crop residue with water to remove the alkali. This treatment results in a wet crop residue with a sodium content of 2%. This method produces a two-fold increase in digestibility of the crop residue. However, the method has several significant disadvantages; it losses about 25% of dry matter, it creates significant waste disposal issues and its economics are not always favorable.

Despite the drawbacks of the Beckmann method many farmers will take their dry crop residue sprinkled or sprayed it with NaOH solution to wet the crop residue to produce a moist material that has a pleasing yellow color and a caustic soda smell. Animals have been shown to eat 10-20% more of this crop residue that untreated crop residue. A variation of this method is the Boliden method developed in Sweden where the crop residue is sprayed using a specially designed apparatus with an alkali solution followed by an acid solution. The saturated crop residue is allowed to stand overnight. The treated crop residue physically resembles the wet treated crop residue but chemically it resembles the dry treated crop residue neutralized with minerals. It has sufficient calcium and phosphorous to eliminate the need for supplements. Both approaches require a degree of sophistication on the part of the farmer to properly treat the crop residue with chemicals and the resulting feed is still lacking in the desirable nutrition needed to sustain a healthy ruminate animal.

Several have tried to improve the NaOH treatment process by using a closed system to eliminate the waste disposal problem. Torgrimsby for example developed a process in which the amount of water added to the system is equal to the amount removed from the crop residue. Three tanks are needed; the first for soaking the crop residue in the NaOH solution (similar to the Beckman method) followed by two rinsing tanks. In the first rinsing tank, the alkali is washed out of the treated crop residue by adding fresh crop residue thus pretreating the new crop residue while increasing the removal of excess NaOH from the treated crop residue. A final washing is performed in the third tank.

Research on the use of ammonia, or $NH_3$, occurred in the mid 1970's. Ammonia, $NH_3$, treatments are less effective than NaOH and requires the crop residue to steep in a closed container in a solution of 30% water and 5% ammonia for 30 days at room temperature. Under these conditions the digestibility of the crop residue has been reported to increase from 29 to 63%. However, waste disposal and processing economics are key draw backs to the adoption of this method.

Mechanical processes such as grinding, chopping, shredding, pelleting, milling and extrusion are all common techniques for reducing the particle size of the crop residue. Generally, coarsely chopped crop residue is the most commonly used method to increase daily intake, improve digestibility and is the most economical approach. However, this treatment is inefficient by it self.

Biological treatment methods with lignolitic mciro-organisms, including bacteria and fungi, and/or enzymic products can be used to break down the bonding structure between cellulose and hemicellulose and lignin in the crop residue, extract and decompose the lignin to release the polysaccharides and oligomers resulting in better access to the processed nutrients of the crop residue for the ruminate micro flora to act upon and improve digestibility. Many factors influence the effectiveness of this approach including selection of the appropriate microorganism, temperature, duration of the fermentation and the quality and composition of the crop residue.

Improving the digestibility and protein content using various techniques have been studied and tried by many researchers. The development of inexpensive, efficient methods of handling and treating crop residue on the farm is of great interest especially in developing areas of Asia and Africa. As populations increase and the demand for food crops increases the pressure on developing livestock feed will continue to increase.

In Ethiopia, for example, which has the largest livestock population in Africa, approximately 26 million head of cattle roam including about 6 million draught oxen. About 80% of these animals are raised in the highlands and are fed, especially in the dry seasons (November to May) by crop residues or cereal crop residues. Some estimates suggest that 40-50% of the livestock feed is composed of cereal crop residue. The animals feed on the crop residues that have either been piled in stacks near the homestead or they eat the residue left in the fields along with standing crop residue.

Farm scale treatment methods or those used by the individual farm require simple and economical processes that any farm with any technical sophistication can implement.

DESCRIPTION OF THE PRIOR ART

Over the years, people have developed various devices to utilize agricultural waste for feedstock into additional forms of animal feed and food for people.

U.S. Pat. No. 8,322,272, of Wenger issued Dec. 4, 2012, relates to a method of extrusion processing a food or feed material by: preconditioning said material by passing the material through a preconditioner vessel from an inlet to an outlet, with moisture addition and continuous agitation between the inlet and the outlet to partially moisturize and precook the material; positively conveying material from said outlet to the inlet of an extruder barrel, by rotating a pair of axially rotatable auger conveying screws having flighting extending from a point proximal to said outlet and into said extruder barrel, with the screws located within a substantially closed housing, said conveying step comprising the step of positively conveying said material substantially throughout the length of said housing; and passing said preconditioned and conveyed material through said extruder barrel and an end most restricted orifice die, and heating the material while subjecting the material to levels of pressure and shear, in order to fully process the material. Wegner preconditions material by heating it and changing its water content prior to using the extruder which raises operating costs and lowers affiance.

U.S. Pat. No. 4,243,686, of Israiledes et al issued Jan. 6, 1981, discloses palatability as well as digestibility for crop residue. Israiledes enhances protein content of crop residue by treating it with a dilute aqueous solution of hydrochloric and phosphoric acids, ammoniating the acid-treated crop residue, and fermenting it with yeast such as *Aureobasidium pullulans*. The so-treated crop residue is useful as a feed for ruminants and other animals. However, it uses chemicals which can degrade the nutritional value and dilutes the final mixture of materials for animal feeds.

U.S. Pat. No. 5,622,037, of Haimer issued Apr. 22, 1997, discloses a pressing or pelletizing device for compacting vegetable materials, in particular grass blades, and that operates with a harvester. To reduce the pressing forces required for the pelletizing process, the pressing channels are heated up to a temperature above 100° C. By heating the pressing channels, local overheating of the device, which could otherwise lead to malfunctions, can be avoided. The pelletizing device has two co-axial hollow cylinders in which the pressing channels are delimited by radial lands which alternatively engage the pressing channels of the other hollow cylinder. Haimer though pelletizes the material so much that it becomes too rigid and of reduced value for the agricultural uses desired and not effective in processing the agricultural waste such as crop residue into nutritional products.

WO1999056555, of Dale et al titled Process and Apparatus for Treating Cellulosic Materials and issued Nov. 11, 1999, discloses a process for expanding cellulosic material with a swelling agent which impregnates the cellulosic material and then rapidly reducing the pressure to thereby expand the cellulosic material by gaseous expansion of the swelling agent. An apparatus or die block on the outlet from the barrel which compresses the cellulosic material before removal from the screw in the barrel. The die block has openings that are inwardly tapered whereby the liquid that is fed to the screw under pressure is expanded or changed from a liquid to a gas upon removal of the cellulosic material from the barrel by the rotation of the screw. Dale has a weakness of cellulosic material, corn fodder or stover, injected with a swelling agent, ammonia. The material then passes through an apparatus at the end of the barrel, designed to expand or change the liquid ammonia into a gas, thereby causing the cellulosic material under pressure to explode. Dale's apparatus design requires the use of a swelling agent and will not work in the absence of ammonia.

The U.S. Pat. Pub. No. 20060201641 to Harris of Sep. 14, 2006 shows methods for producing pulp and treating black liquor. These methods heat a wood pulp liquor to 650° C. using alkaline metal oxides and removal of inorganic materials. The processing yields a white liquor for further use.

The U.S. Pat. Pub. No. 20080233244 to Swenson of Sep. 25, 2008 provides animal food compositions and treats. These composition utilize a plant protein put into a structure. The structure includes aligning the plant fibers, providing a fat substance, and adding at least one nutrient.

The publication WO2002019838 to Edberg of Mar. 14, 2002 describes a method of encapsulating animal feed into a shell. Edberg shows two screw conveyors, one blending feed and the other blending shell constituent. The method also cooks the shell constituent to gelatinize any starches therein.

And, the U.S. Pat. Pub. No. 20110081336 to Medoff of Apr. 7, 2001 shows a biomass processing method for making useful products. This process uses various components including swelling agents with an alkali base.

SUMMARY OF THE INVENTION

The present invention is a method and apparatus to process various crop residues into products such as animal feed, flour, and/or alcohols. Generally, a pressure device of the present invention has a rifled barrel, or cylinder, a powered turning shaft within the barrel, an end cap also with a rifled interior, a section attached to the end of the pressure device by a clamp to withstand increased pressure, a circular flange welded to a male pipe connection of which the first section is unthreaded and the remaining portion is threaded, a popper device being a circular plate or a cone, the circular plate containing multiple holes and then inserting into a stationary female cap to align the outer holes on the plate with the multiple rifling grooves in the barrel, and the flange threadily engages the stationary female cap to secure the plate. The rifled barrel provides both shearing and increased pressure on the crop residue as it passes through the pressure device barrel. The increased surface area, provided by the rifling grooves, creates more friction between the crop residue and the barrel wall thereby increasing the internal temperature and pressure, improving the quality of the end product. The rifling, when out of alignment with the screw channel, also creates a pressure chamber effect that further impacts the breakdown of the internal molecular chains in the crop residue. The rifling in cooperation with the turning shaft advances the crop residue along the barrel under pressure towards a popper device, being a plate or a cone. The pressure in the system forces the crop residue through the holes around the perimeter of the plate. The center hole in the plate relieves excess pressure that may develop. The crop residue has exposure to sufficient shear forces and absorbs sufficient water such that the chopped pieces under pressure will explode causing the long chain cellulose molecules to form small chain proteins. The protein content exceeds 365% greater than unprocessed crop residue.

There has thus been outlined, rather broadly, the more important features of the invention in order that the detailed description thereof that follows may be better understood and that the present contribution to the art may be better appreciated. The present invention also includes in the circular plate, six holes are $d_1$ in diameter and spaced equidistance around the plate, a seventh hole is $d_1$ in diameter and is ½ times $d_2$ from the outer edge of the plate, as later shown in FIG. 9A, the six holes of $d_1$ holes—installed in the stationary female cap and secured by the threaded flange—coincide with the rifling grooves on the interior surface of the end cap, and the cone embodiment of the popper device has half of its tip removed. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a system for processing various crop residues into an animal feed that is nutritious, palatable, and digestible by ruminate animals and also into flour for human consumption and alcohols.

Another object is to provide such a system for processing crop residue into more nutritional products that uses an apparatus that eliminates chemical additions and provides a simplified, efficient, effective and economical way to process various crop residues.

Another object is to provide such a system for processing crop residue into more nutritional products that has a screw turning in the range of about 100 to about 500 revolutions per minute, or "R.P.M.," based on the feed rate.

Another object is to provide such a system for processing crop residue into more nutritional products that has a pressure at the exit end of the turning shaft in the range of about 30 bars to about 50 bars.

Another object is to provide such a system for processing crop residue into more nutritional products that has a temperature at the exit end of the turning shaft in the range of about 130° C. to about 170° C.

Another object is to provide such a system for processing crop residue into more nutritional products that maintains internal temperatures and pressures through a water cooling jacket thus reducing the likelihood of the crop residue burning.

Another object is to provide such a system for processing crop residue into more nutritional products that ferments the processed crop residue to obtain alcohols or to grow lactic acid bacteria on the processed crop residue to obtain other end products.

Another object is to provide such a system for processing crop residue into more nutritional products that is capable of manufacturer and distribution at a price suitable for the end customers, supply houses, and distributors to provide.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

These and other objects of the present invention will become apparent to those skilled in this art upon reading the accompanying description, drawings, and claims set forth herein.

BRIEF DESCRIPTION OF THE DRAWINGS

In referring to the drawings.

The same reference numerals refer to the same parts throughout the various figures.

DETAILED DESCRIPTION OF PREFERRED EMBODIMENT

The present art overcomes the prior art limitations by providing a pressure device to process various crop residues into nutritional animal feed and a method of operating the device. The preferred embodiment of the pressure device includes a pressure device with a rifled barrel 9 cylindrical in shape, see FIG. 7, an end cap 40, see FIG. 8, and with a rifled interior as at 38 of FIG. 8, a section attached to an end of the pressure device by a clamp to withstand increased pressure see FIG. 10, a circular flange 36, see FIG. 8 welded to a male pipe 35, see FIG. 8, the male pipe having a connection unthreaded upon a first section and the remainder threaded, and a circular plate 32, see FIG. 8, containing multiple holes.

The circular plate 32 has six holes 41 having a diameter of $d_1$ and spaced equidistance around the plate and a seventh hole also of a diameter $d_1$ but with a spacing of one half $d_2$ from the outer edge of the plate, see FIG. 9. The six holes 41 of d₁ diameter, on the outer perimeter of the circular plate 32 that is installed in the stationary female cap 30 and secured by the threaded flange 35, align with the rifling grooves 38 on the interior surface 34 of the end cap 40. The circular plate 32 with the multiple holes 41 inserts into a stationary female cap 30, see FIG. 8, that allows the outer holes on the plate to align with the multiple rifling grooves in the barrel. The threaded flange 35, see FIG. 8 threadily engages the stationary female cap 30, see FIG. 8 and holds the plate securely in place.

Figures 7A, 7B, 7C, 7D:
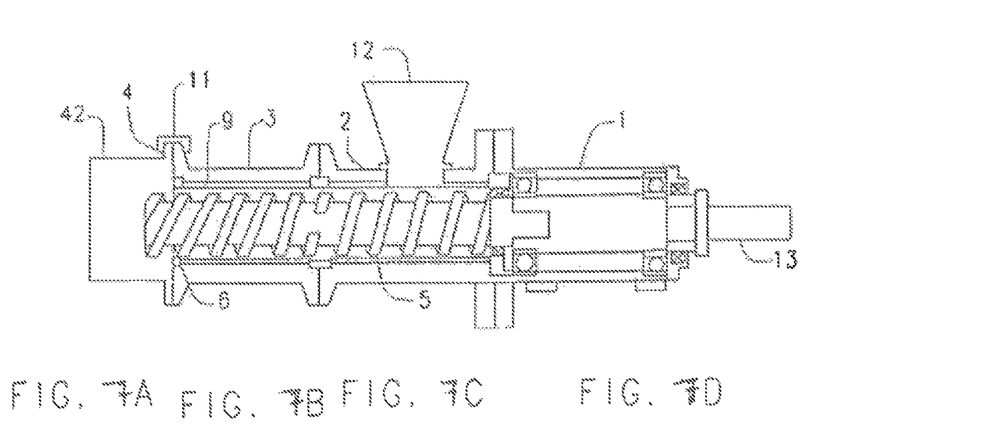
FIG. 7 is a side sectional view of an alternate embodiment of the pressure device of the invention.

The rifled barrel 9, see FIGS. 1, 7 provides shearing and increased pressure upon the crop residue as it moves through the pressure device barrel. The increased surface area provided by the rifling creates more friction between the crop residue and the barrel wall thereby increasing the internal temperature and pressure upon the crop residue which improves the quality of the end product. As the crop residue moves through the barrel, the pressure device using the turning shaft pressurizes the crop residue so that it attains maximum pressure when within the popper device. Inside the popper device, the crop residue reaches its maximum pressure as the turning shaft forces the crop residue against the popper device. Additional crop residue approaching the reside inside the popper device comes to bear against the leading crop residue which minimizes cavitations within the popper device. The rifling, when out of alignment with the screw, or vanes, upon the turning shaft, also creates a "pressure chamber" effect that further breaks down the internal molecular chains in the crop residue. The pressure in the apparatus forces the crop residue through the holes 41 around the perimeter of the plate 32. During operation, the popper device steadily releases crop residue in powder form. The center hole in the plate relieves excess pressure upon its occurrence.

The crop residue within the apparatus undergoes sufficient shear forces and absorbs sufficient water such that the chopped pieces under pressure will explode causing the long chain cellulose molecules to form small chain proteins. The protein content reaches as much as 365% greater than unprocessed crop residue.

The preferred embodiment of the apparatus for processing crop residue also includes a hopper for feeding crop residue to a pressure device modified with rifling on the inner wall of the pressure device barrel and a popper in the form of an exit plate on the exit end of the pressure device's turning shaft, or screw. The crop residue is pre chopped to a length of about 0.25 inches to about 0.50 inches. Water in the amount of about 75% by weight is sprayed onto the chopped crop residue prior to adding it to the hopper. Based on the feed rate, the unit is operated between about 100 r.p.m. to about 500 r.p.m. From the hopper 12, see FIG. 7, the wetted crop residue enters the rifled barrel 9, see FIG. 7, then undergoes heating from about 130° C. to about 170° C. and maintained at from about 30 bars to about 50 bars of pressure. As the crop residue progresses through the rifled barrel 9, see FIG. 7 it faces shearing forces from the screw which breaks down the crop residue. As the screw rotates in the barrel with the rifling on the inner surface, a "pressure chamber" arises. As the crop residue advances forward under compression, it becomes compacted in the barrel and when the channel in the screw aligns with the rifling, the pressure within the crop residue releases. The cyclic pressure buildup and release as the crop residue proceeds along the pressure device barrel with the rifling contributes to an end product that meets the desired nutritional output. When the crop residue reaches the end of the screw, the apparatus forces it through the popper as in popper device 42 having a flange 4 in section A of FIG. 7, where the crop residue then enters under force one of the several holes 41 in the stationary plate 32, see FIG. 8, secured in the stationary metal block 30, see FIG. 8 and section A in FIG. 7 at the end of the barrel. As the screw rotates and the residue—in the space formed by the rifling and the channel depth of the screw—aligns with the holes in the circular plate, the apparatus forces the crop residue out of the unit through the holes. The combination of the rifling in the pressure device barrel and the positioning of the holes in the popper device creates a situation where at any given time a portion of the crop residue remains in the "pressure chamber" and a second portion endures compression and a pushing force through the exit holes in the popper device. The pressurized crop residue exits through the holes abruptly and creates a "popping" sound. The release of steam as the crop residue exits the end of the apparatus leaves the exiting material dry and ready for consumption.

Figure 6A:
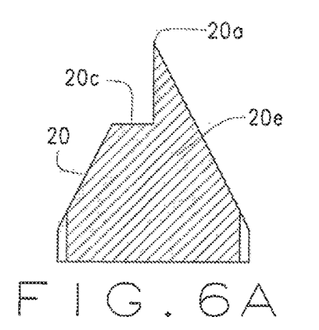
FIG. 6a shows a sectional view of the exit cone of the invention.
Figure 6B:
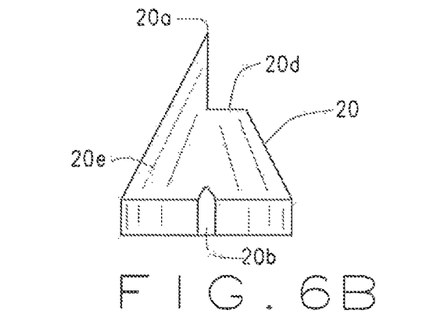
FIG. 6b shows a side view.
Figure 6C:
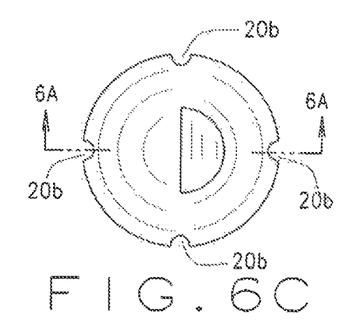
FIG. 6c shows a top view.
Figure 6D:
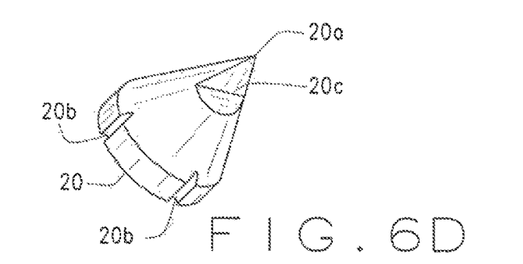
FIG. 6d shows a perspective view.

Another embodiment of a pressure device for processing crop residue comprises a hopper for feeding crop residue to a pressure device modified with rifling on the inner wall of the pressure device barrel and a popper apparatus as in section A of FIG. 1. This popper apparatus has the form of an exit cone in an exit nozzle assembly on the exit end of the turning screw see FIGS. 2a, 2b. The crop residue has a pre-chopped length of about 0.25 inch to about 0.50 inch. Water in the amount of about 75% by weight is sprayed onto the chopped crop residue prior to adding it to the hopper. Based on the desired feed rate, the apparatus operates between about 100 r.p.m. to about 500 r.p.m. From the hopper 12 see FIG. 1 the wetted crop residue enters the rifled barrel 9 see FIG. 1 and then undergoes heating from about 130° C. to about 170° C. at a pressure of about 30 bars to about 50 bars. As the crop residue progresses along the rifled barrel 9 see FIG. 1, the apparatus imparts shearing forces from the screw to the residue which breaks it down. The rifling of the barrel increases friction and raises the pressure on the crop residue improving the quality of the end-product. As the screw rotates, in the barrel with the rifling on the inner surface, a "pressure chamber" forms. As the crop residue moves along under compression, it compacts within the barrel. When the channel in the screw aligns with the rifling, the apparatus releases the pressure within the crop residue. The regular pressure buildup and release as the crop residue moves through the pressure device barrel with the rifling contributes to an end-product of desired nutritional output. Attaching to the barrel of the pressure device, a popper has an assembly block as later shown in FIGS. 2a, 2b with an exit nozzle assembly as later shown in FIGS. 2a, 2b threaded into the assembly block. The external adjustment insert has a nut, as later shown in FIG. 4 upon one end that allows it to slide in and out of the assembly block. Inside of the external adjustment insert, an exit nozzle housing has an exit hole off the center line of the unit. Moving the position of the exit cone assembly changes the size of the cavity that occurs when the asymmetric exit cone is toed in the exit housing. The exit cone 10 as later shown in FIGS. 2a, 2b also attaches to the end of the screw. The crop residue moves from the screw through the indentations 20b in FIG. 6c on the external wall of the cone, see FIGS. 6b, 6c, 6d, and fills the asymmetric tip of the exit cone. As the nut on the external adjustment insert tightens, the "pressure chamber" builds when the position of the asymmetric cone blocks the exit hole. Adjusting the external adjustment insert maintains the desired pressure in the "pressure chamber." The location of the exit hole off the center line relative to the tip of the asymmetric cone allows the crop residue to exit from the exit hole for every half revolution and prevents from doing so during the other half revolution with a closed exit hole. When the exit cone rotates and the exit hole becomes aligned with the asymmetric part of the exit cone, the open position, the pressure releases, the crop residue explodes and the material exits the unit. When the material exits the popper device a popping sound occurs as the steam escapes from the crop residue leaving the material dry and ready for consumption.

Typically in the operation of the apparatus, the crop residue has a pre-chopped length of about 0.25 inch to about 0.50 inch and water in the amount of about 75% by weight is sprayed onto the chopped crop residue prior to adding it to the hopper. From the feeder the wet chopped crop residue moves to the shaft and processed into the pressure device with the rifled barrel until it reaches the popper device.

The pressure device has a power source at the feeding end capable of turning the turning screw in the range of about 100 r.p.m. to about 500 r.p.m. based on the feed rate and the turning screw has a variable pitch for its vanes, or variable screw pitch. Proximate the exit end of the barrel, the variable screw pitch decreases upon the turning shaft and in doing so, the pressure rises within the barrel near the exit end. This device also has a pressure at the exit end of the turning shaft in the range of about 30 bars to about 50 bars, and a temperature in the range of about 130° C. to about 170° C. Throughout the device, it uses a water cooling jacket to maintain the temperature and pressure. Maintaining these parameters within operating ranges prevent the crop residue from burning within the device or upon leaving the device at an exit end, that is, opposite the feeding end.

In a further alternate embodiment, the invention includes an operating method that ferments the processed crop residue to obtain alcohols with lactic acid bacteria on the processed crop residue to obtain other end products.

FIG. 1 shows a side sectional view of the pressure device with the popper device to the end. The raw material input hopper 12 receives the input crop residue into the pressure device for processing. The pressure device assembly includes a bearing assembly as shown in sections B, C. The housing of the pressure device is identified as components 2, 3 each having a hollow cylindrical interior with rifling grooves 9 machined therein. A pressure device turning shaft, or screw 5, has a concentric position within the cylindrical housing 2, 3. The popper device, as at 4, based on the cone configuration 10 connects to the pressure device in section A. The housing extends through sections B, C and the pressure device receives its rotational power from a motor 13 within a casing 1 shown in section D. The casing connects to a flange of housing 2 as shown.

Figure 1A:
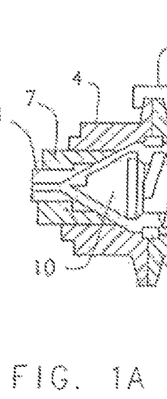
FIG. 1 is a side sectional view of the pressure device of the invention.
Figure 1B:
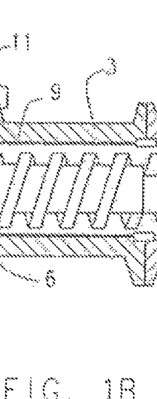
Figure 1C:
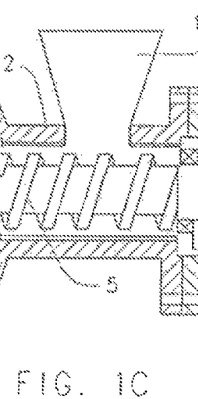
Figure 1D:
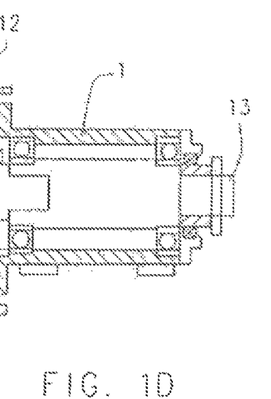
Figure 2A:
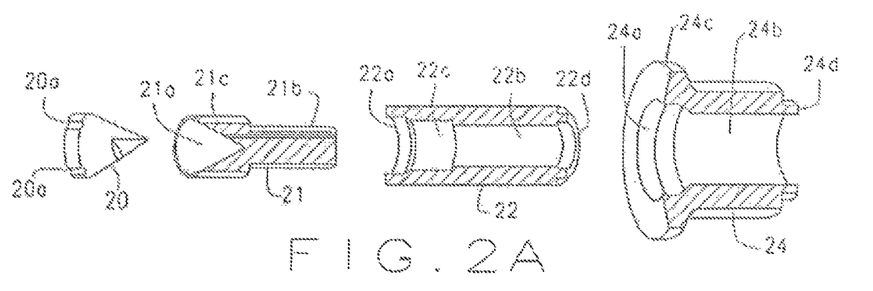
FIG. 2a is an exploded sectional view of the invention and FIG. 2b is a section view of the invention.

Attaching to the barrel of the pressure device with a clamp 11 in FIG. 1, an assembly block 4 has an exit nozzle assembly 7 threadily connected on the interior of the assembly block so that crop residue exits through the tip as at 8. FIG. 2a is a sectional exploded view of the popper device based on the exit cone embodiment of FIG. 1. The exit cone embodiment includes a cone 20 having a base with indentations 20a spaced around the perimeter of the base. Opposite the base, the cone 20 has a truncated tip as later shown and described. The cone fits into an exit hole housing 21, generally elongated and cylindrical with a step inward in diameter as shown. The exit hole housing has a conically shaped receptacle as at 21a that receives the tip of the cone within the wider portion of the housing as at 21c. The housing has a bore extending from off center in the receptacle lengthwise through the housing from the wider portion 21c through a narrower portion as at 21b. The bore extends generally parallel to the length of the exit hole housing. Then the exit hole housing fits into an external adjustment insert, 22. The external adjustment insert has two opposite ends with an open end 22a and an opposite partially closed end 22d with a nut. The nut has a location the end 22d that allows the exit nozzle assembly to slide in and out of the assembly block 4. The insert has its inner chamber 22b and its wider chamber 22c. The wider chamber 22c receives wider portion 21c of the housing and the inner chamber receives the narrower portion 21b of the housing as later shown. The assembly block has a more detailed form, as at 24. The assembly block has a flange 24c with a central opening 24a and the central opening receives the closed end 22d of the external adjustment insert 22. The assembly block then has its inner chamber 24b that accepts the insert 22 with the bore begin parallel to the length of the block and the bore exiting through a neck 24d opposite the central opening. The flange 24c abuts the housing 3 so that the neck extends outwardly from the pressure device as previously shown in FIG. 1.

Figure 2B:
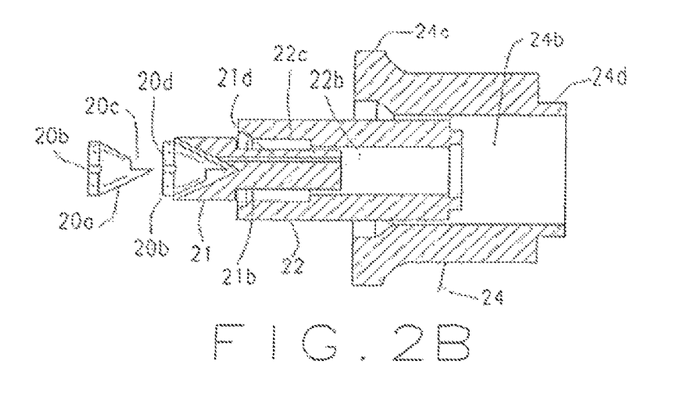

FIG. 2b shows the exit cone embodiment in a partially nested form and in a sectional view. The assembly block 24 receives the end 22d of the insert, that is, the nut enters the central opening first. The open end 22a of the insert 22 accepts the exit hole housing 21 bore exit first, that is, thinner portion first. The receptacle 21a then receives the cone 20 here shown with its base 20d and one indentation 20b oriented downwardly. Towards the middle of this figure, the embodiment has the cone placed adjacent to the receptacle with the tip forward and having the removed portion of the tip downwardly. Outwardly from the middle of this figure, the cone may have an orientation 180° in rotation differently, that is, with the removed portion of the tip upwardly. The assembly block, insert, housing, and cone nest concentrically upon a common axis. The flange 24c generally abuts the housing 3 while the base 20d of the cone 20 engages the turning shaft 5, or screw, as previously shown in FIG. 1. In use, moving the position of the exit cone assembly changes the size of the cavity that occurs when the asymmetric exit cone inserts into the exit nozzle housing.

Figure 3A:
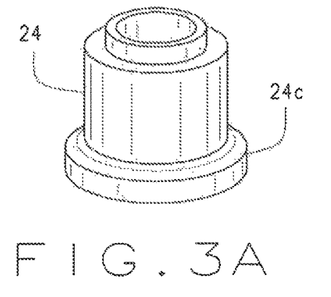
FIG. 3a shows perspective view of the assembly block of the invention.
Figure 3B:
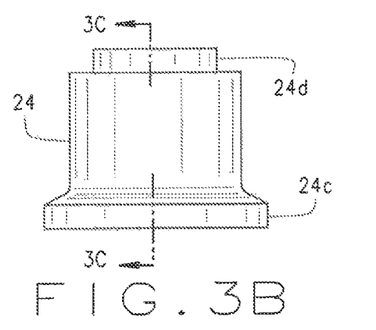
FIG. 3b shows a side view.
Figure 3C:
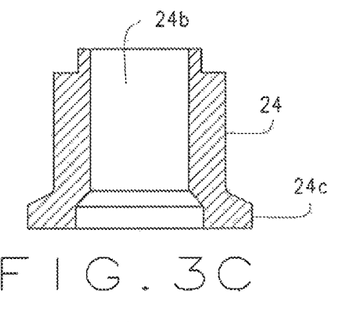
FIG. 3c shows a sectional view.
Figure 3D:
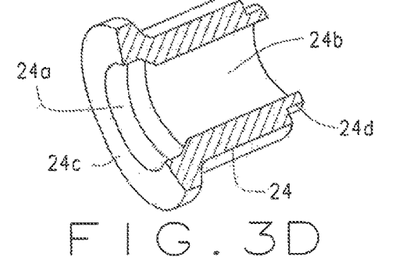
FIG. 3d shows a sectional perspective view.

Four views of the popper device assembly block 24 of FIG. 2A then appear in the next set of related figures. FIG. 3a shows a perspective view of the block 24 with its neck upwardly and the flange 24c downwardly. FIG. 3b has a side view of the block 24 with the flange 24c at the bottom of the figure and the neck 24d opposite it at the top of the figure. The neck generally has a lesser diameter than the flange. FIG. 3c then provides a side sectional view of the block 24 with the inner chamber 24b extending from the flange 24c to the neck 24d. And FIG. 3d shows a further sectional view, similar to a portion of FIG. 2a. The block 24 has its flange 24c with its central opening 24a into the inner chamber 24b. The inner chamber extends through the block and opens at the neck 24d.

Figure 4A:
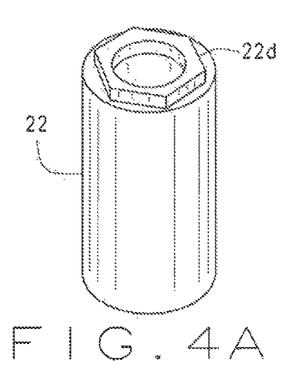
FIG. 4a shows perspective view of the adjustment insert of the invention, FIG. 4b has a side view, FIG. 4c has a top view, and FIG. 4d has a sectional view.
Figure 4B:
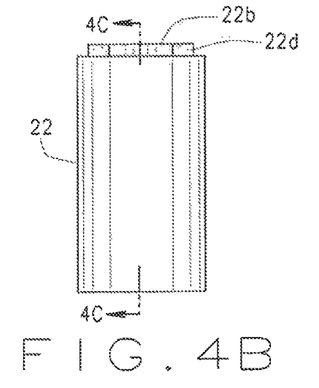
Figure 4C:
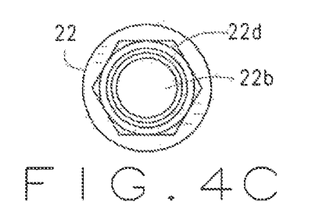
Figure 4D:
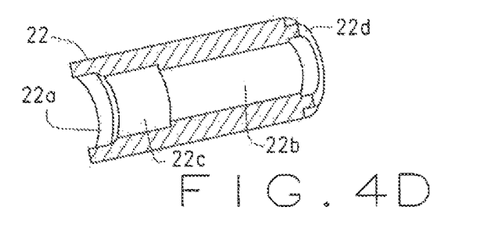

Next inwardly from the block 24, four views of the external adjustment insert 22 show it in preparation for threading into the assembly block. The insert 22 has a generally hollow round cylindrical form. FIG. 4a shows a perspective view of the insert 22 with the closed end 22d, or neck, having its hexagonal nut like structure, suitable for receiving a toolhead. The nut like structure though is hollow so that the bore may exhaust through the opening during usage. FIG. 4b shows a side view of the insert with the closed end 22d and its nut opposite the open end towards the bottom of the figure. FIG. 4c then provides a top view of the insert 22 showing the closed end 22d and the opening through the nut into the inner chamber 22b the inner chamber opens into the wider chamber to allow passage through the length of the insert. And FIG. 4d shows a further sectional view as also shown in a portion of FIG. 2a with the insert 22 having its opening 22a, or open end, leading to the wider chamber 22c, or second chamber, that leads into an inner chamber 22b that then opens into the closed end 22d, more particularly through the nut. During use, the exit nozzle housing, 21, is pressed into the external adjustment insert, 22. Together they form the exit nozzle assembly. As shown in FIG. 4d, the nut on the end of the external adjustment insert sets the distance between the exit nozzle assembly and the exit cone.

Figure 5A:
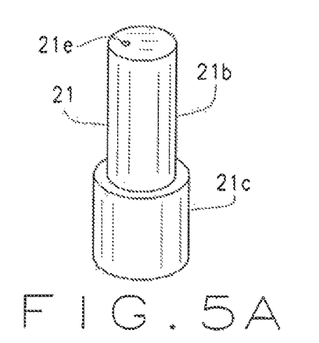
FIG. 5a provides a perspective view of the exit housing of the invention, FIG. 5b provides a side view.
Figure 5B:
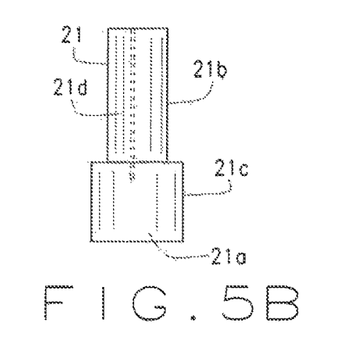
Figure 5C:
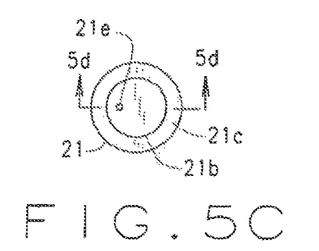
FIG. 5c shows a top view.
Figure 5D:
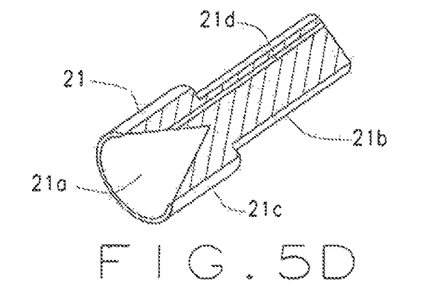
FIG. 5d shows a sectional view.

Then inwardly from the insert, four more views of the exit housing 21 are shown and with an exit hole, as at 21e, outwardly from the centerline of the exit housing and typically off the centerline of the invention during usage. FIG. 5a shows a perspective view of the housing 21 with its wider portion 21c towards the bottom of the figure with the narrower portion 21b generally collinear and centered upon the wider portion. The narrower portion has a length generally more than the height of the wider portion as shown. The narrower portion has a bore extending axially though off center as previously described. The bore has its opening 21e for exhausting crop residue there through. FIG. 5b then shows the exit housing 21 in a side view. The housing has its narrow portion 21b upon the wider portion 21c that contains the receptacle 21a not shown. The narrow portion includes the bore, here shown in dotted line as at 21d. Turning the housing, FIG. 5c then provides a top view with the narrow portion 21b in the foreground center and the wider portion 21c rearwardly. The narrow portion shows the bore opening as at 21e. And FIG. 5d shows a further sectional view of the housing with the receptacle 21a to the left and within the wider portion 21c. The receptacle admits one opening of the bore 21d. The bore has its location off the center line relative to the tip of the asymmetric cone, not shown but see FIG. 2b, that permits the crop residue to exit the apparatus at the bore opening 21e hole for every half revolution and but not for the other half revolution as it is closed by the remainder of the cone tip. The bore has an off center alignment relative to the tip.

And FIG. 6 provides four views of the exit cone 20 that has its location at the end of the screw, or turning shaft 5, in the rifled barrel as at 9, that is, at the exit end of the device. FIG. 6a shows a sectional view of the cone 20 with its tip 20 towards the top of the figure. The tip is generally pointed and shown as triangular from a section through a conical tip. The tip though has approximately half of it removed, as at 20c, for a portion of the length of the cone 20. The tip has a partial frusto-conical shape where the removed portion shows the tip as truncate axially forming a partial chord. The removed portion, akin to a chordal like shape, has a length less than a third of the cone's length. The removed portion 20c has a right angle along the centerline of the cone as shown. The cone has a generally solid construction as at 20e. Then FIG. 6b has a side view of the cone 20 here with the tip 20a to the left of the figure, opposite that of FIG. 6a. The tip 20a begins at a point and then extends downwardly to the bottom of the removed section as at 20d and then outwardly for approximately 180°. The cone 20 has an internal angle beginning at its tip from about 25° to about 70°. The internal angle of the cone extends from the tip to the base with its indentations as at 20b. To further assist viewing the cone, FIG. 6c then provides a top view of it with the tip 20a generally towards the center and the removed section towards the left. The solid portion of the tip appears towards the left with the remainder of the cone while the removed portion, particularly its flat base, appears akin to a letter D shape as shown. The base has its plurality of indentations 20b spaced upon its perimeter. And FIG. 6d shows a perspective view of the cone 20 with the tip 20a oriented towards the upper left, that is, towards the remainder of the assembly block 4 towards the housing 3 of the pressure device as previously shown in FIGS. 1, 2a. The tip 20a commences at point and then flares outwardly with the internal angle of the cone except for the removed section 20c. The removed section leaves the tip in place for approximately 180° of rotation about the centerline of the cone. During use, the base of the cone abuts the turning shaft 5, or screw, and the crop residue feeds to the base and then through the indentations 20b on the base of the cone, around the cone's base of the cone, along the cone's conical surface, and to the asymmetric tip 20a.

FIG. 7 shows a side sectional view of the pressure device with a plate assembly embodiment of the popper device, or plate. The raw material input hopper 12 receives crop residue fed into the pressure device for processing. The pressure device assembly includes a bearing assembly 1 journaled to a motor or other power source as at 13 in section D. The housing 2, 3 of the pressure device, located in sections B and C has a cylindrical hollow interior with rifling as at 9. A pressure device turning screw 5 has a location coaxially within the cylindrical housings 2, 3. The popper device, as at 42, connects to an end 6 of the turning screw 5, of the pressure device, in section A.

Figure 8:
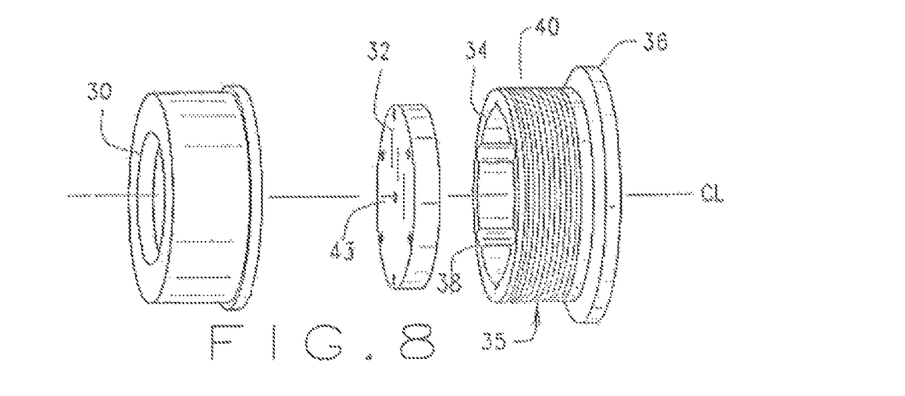
FIG. 8 is an exploded view of the invention.

FIG. 8 is an exploded side view of the popper device 42 shown towards the left in FIG. 7, as at section A. This embodiment of the popper device, as at 42, has a circular planar plate 32, or round plate. The plate has a perimeter and a plurality of holes equally spaced around the perimeter. A center hole 43 operates as a pressure relief during usage. The plate has a thickness, later shown as 44 in FIG. 9b, and the holes extend through the thickness of the plate. The thickness spans between a front face and an opposite back face of the plate. The circular plate fits within a stationary female cap 30 generally visible upon the exterior of the pressure device when assembled for usage. The female cap has a generally hollow form with a threaded open end, here shown to the right, and a partially closed other end here shown to the left. Having the plate 32 within the cap 30, a male threaded end cap 40 threadily engages the cap. The male cap has a hollow interior 34 with a plurality of rifled grooves 38 evenly spaced around the interior. The grooves approximately extend through the height of the cap, that is, from the left to the right in this figure. Preferably, the male cap includes six grooves equally spaced upon the interior of the male cap and each groove extending for the length of the male cap. The male cap has its threading 35 upon the exterior and then a widened flange 36 upon one end, that is, opposite the female cap 30. The male cap threadily engages the female cap. The flange 36 abuts the housing 3 when secured by the clamp 11 at the junction of sections A and B as at 4.

As previously shown in FIG. 7, the turning shaft 5 extends partially into the male cap 30 as at 6. Turning the shaft 5 advances crop residue from the hopper towards the plate 32, of the popper device, within the female cap 30. The exit holes and the rifling grooves 38 in the interior of the barrel 9 align and as the shaft 5 turns, so when the screw depth attains its maximum, that is, largest amount of screw blade shown against a groove 38, a pressure chamber forms. The screw blade compresses the crop residue abruptly, raising its temperature and pressure to the vaporization point of entrained moisture, thus causing the crop residue to explode, breaking the cellulosic chains and releasing steam out of the female cap 30. More particularly upon the screw, or turning shaft 5, the crop residue, under extreme pressure, ejects from the holes in the circular plate 32, e.g. seven holes as shown in FIG. 8.

Figure 9A:
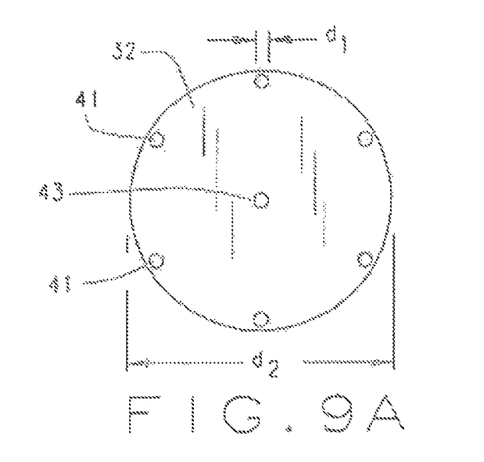
FIG. 9a describes a top view of the circular plate of the invention and FIG. 9b shows a side view.
Figure 9B:
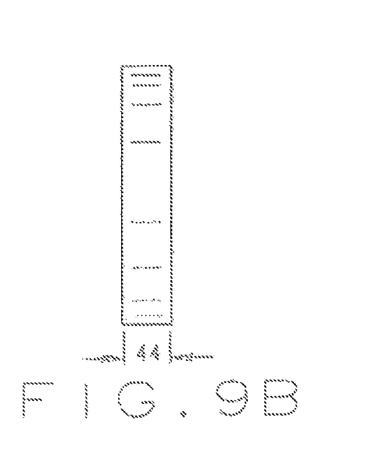

Turning to the plate itself, FIG. 9a is a top view of it as at 32, located within section A of FIG. 7, where the circular plate has a plurality of holes 41 upon its perimeter and extending through the thickness 44 of the plate as shown in FIG. 9b. The holes of FIG. 9a have a slight spacing inwardly from the perimeter for structural support, integrity of the plate, and sealing of the plate to the cap 30. The processed crop residue ejects through one of the holes 41 in the circular plate as it leaves the heated and pressurized cylinder, proximate the end 6 of the turning shaft. The holes have a diameter of $d_1$ on the circular plate 32 having a diameter of $d_2$. The change from the heated and pressurized cylinder to ambient temperature and pressure allow the crop residue to explode as the heat and pressure inside it abruptly escapes as it exits the apparatus when the rifled grooves 38 align with the holes.

Figure 10:
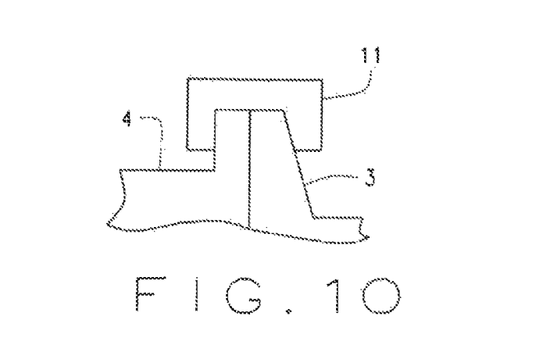
FIG. 10 illustrates a side view of the clamp connection.

FIG. 10 is a detailed view of the clamp 11 connecting housing section 3 with popper device, as at 4, of the pressure device in FIGS. 1, 7.

Figure 11:
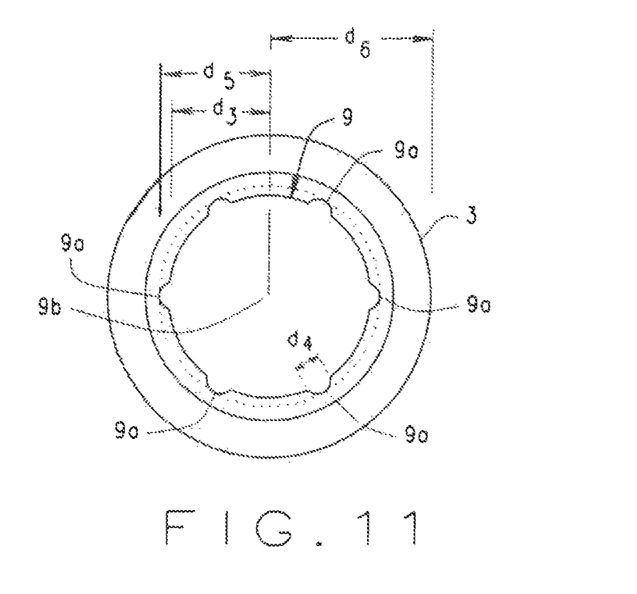
FIG. 11 shows an end view of the barrel of the invention.

FIG. 11 illustrates an end view into the pressure device barrel 9 with the outer wall and the inner wall of the screw housing 3 having rifling groves 38 each with an outer depth as at 9a. The rifling grooves each have their diameter of $d_4$ at the interior surface. The groove diameter, $d_4$, is from about 10 mm to about 150 mm. The distance from the center of the barrel 9 to the interior surface as at $d_3$ exceeds that of diameter $d_4$ and that of the distance from the center of barrel to the bottom of the grove as at $d_5$. The distance $d_6$ indicates the distance from the center of the barrel to the exterior surface of the pressure device barrel, and this distance $d_2$ exceeds these distances, $d_5$, $d_3$, $d_4$. The ratio of the groove diameter $d_4$ to the distance from the center of the barrel to the interior barrel surface $d_3$ is approximately 1:7.5. In the preferred embodiment, the rifling grooves spiral along the length of the barrel. In an alternate embodiment, the rifling grooves spiral clockwise. In an alternate embodiment, the rifling grooves spiral counter clockwise. In a further alternate embodiment, the rifling grooves extend straight and parallel to the length of the barrel.

Figure 12A:
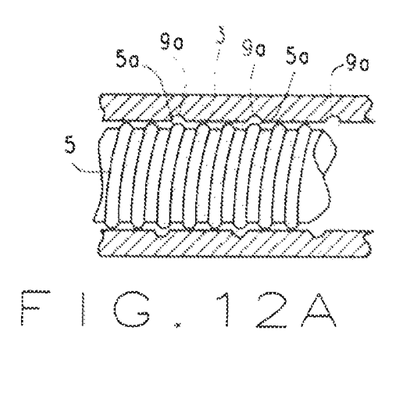
FIG. 12a provides a sectional view of the barrel with the turning shaft in an operative position, and FIG. 12b show a sectional view with the turning shaft rotated out of an operative position.
Figure 12B:
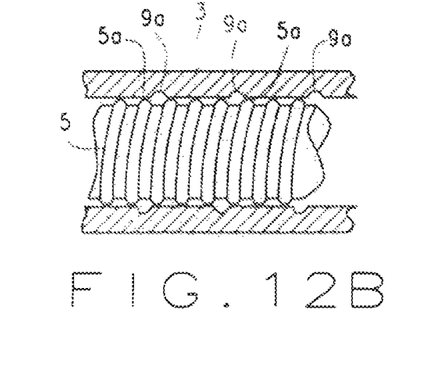

FIGS. 12a, 12b illustrate two sectional views of the screw, or turning shaft 5, position relative to the rifling in the barrel. FIG. 12a shows the crop residue as under pressure from the vanes 5a of the screw 5 appearing adjacent to the rifling grooves as at 9a. The vanes of the screw compress the crop residue into the rifling. In the preferred embodiment, the spiral of the rifling grooves has an opposite direction to the rotation of the turning screw. Then FIG. 12b provides a view of the crop residue in a lower pressure condition, that is, upon release of the pressure. The vanes of the screw retreat from the rifling groves as at 9a so that the crop residue has a greater volume into which it expands in the gap between screw vanes. The crop residue undergoes compression and release cycles as the turning shaft 5 moves it along the barrel. As the crop residue moves along, it accumulates proximate the end 6 of the turning shaft. The rotation of the screw relative to the rifling creates a pressure chamber effect that breaks down the crop residue in preparation for its entry into the popper device, whether in cone or in plate embodiment.

In the embodiments of this invention, the pressures attained within the barrel proximate the cone or the plate cause the crop residue to explode from the cone or the plate and out of the pressure device. The processed crop residue that has exited from the pressure device has its long chain cellulose molecules broken down. The apparatus of the invention leads to much shorter cellulose molecules of higher nutritional value in smaller chain proteins. The proteins increase by 365% by using this apparatus. The processed crop residue material from the present invention can serve as animal feed, a ground flour suitable for nutritional supplement in food or animal feeds, and it can undergo further processing by fermentation into useful alcohols.

EXAMPLES

Example 1

Chop a crop residue to 5 to 10 mm, or 0.25" to 0.50", add 20% water from the dry weight of the crop residue and process it through the pressure device equipped with a popper device. After processing, 30 to 35% of the crop residue changes into a nutritional feed material.

Example 2

Chop a crop residue to 5 to 10 mm, add 50% of water by weight and process it through the pressure device equipped with a popper device. After processing, 70 to 75% of the crop residue changes into a nutritional feed material.

Example 3

Chop a crop residue to 5 to 10 mm, add 75% of water by weight and process it. After processing it through the pressure device equipped with a popper device, 95 to 100% of the crop residue changes into a nutritional feed material.

The material exiting the device has a dry form, ready for consumption, when the pressure released from the exploded crop residue and the condensed moisture evaporates. The apparatus of the present invention produces improved processed crop residue without adding chemicals, such as NaOH, ammonia or enzymatic bacteria to the crop residue before processing. The present invention only requires the crop residue to be sprayed with water in the approximate amount of 75% by weight before adding to the hopper for processing by the present invention.

In an alternate embodiment, the nutritional value of the converted crop residue increases following placement of it in a sterile bag and mixed with probiotic microbial barm. After about twelve days of curing, the enhanced feed has nutritional value comparable to milk. The crop residue treated as above has highly suitable nutritional media for the growth of lactic acid bacteria. During a period of ten to twelve days, lactic acid bacteria growth has the range of $10^8$ colony forming units, or about the same amount of bacteria that would grow in milk, in serum milk, or in commercial bacterial growth media. The processed crop residue can also be fermented to produce alcohols due to the high levels of sucrose and sugar in the end product.

From the aforementioned description, an apparatus and method for processing crop residue into more nutritional products has been described. A few exemplary embodiments of this invention have been described in detail above. Those skilled in the art will readily appreciate that many modifications are possible in the exemplary embodiments without materially departing from the novel teachings and advantages of this invention. All such modifications are intended to be included within the scope of this invention as defined in the following claims.

The apparatus and method for processing crop residue into more nutritional products is uniquely capable of heating and pressurizing crop residue and ejecting it abruptly yielding a nutritional feed from the invention. The apparatus and method for processing crop residue into more nutritional products and its various components may be manufactured from many materials, including but not limited to, steel, aluminum, polymers, ferrous and non-ferrous metal foils, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects and without specific details. For purposes of explanation, specific numbers, materials and configurations have been set forth in order to provide a thorough understanding of the illustrative embodiments. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A pressure device processing crop residues into nutritional feed, said device having a hopper adapted to receive crop residue, a barrel connecting to the hopper, the barrel having a hollow rifled cylindrical interior, a turning shaft locating within the barrel and with a variable screw pitch, the turning shaft having a feeding end proximate the hopper and an exit end oppositely, said device comprising:

an assembly connecting to the barrel, said assembly having a popper device placed therein, said popper device is adapted to receive crop residue through said barrel;

wherein said popper device is an exit nozzle;

said exit nozzle having an exit cone, an exit housing receiving said exit cone, and an external adjustment insert receiving said exit housing, and said assembly having an assembly block receiving said external adjustment insert, and wherein said exit cone, said external adjustment insert, and said exit housing assemble concentrically within said assembly block;

said external adjustment insert having an open end and an opposite partially closed end having a nut thereon adapted to receive a tool head, and said external adjustment insert containing said exit housing and said exit cone therein;

said exit cone is adapted to connect to the exit end and having a base and an opposite tip and including indentations on said base proximate said exit end and said tip having a partial frusto-conical shape truncated axially as a partial chord;

said exit housing having an axial bore in off center alignment relative to said tip, said axial bore terminating in an exit hole; and, wherein said exit cone blocks the crop residue from exiting at said exit hole for every half revolution of the turning shaft.

2. The pressure device of claim 1 further comprising:

said exit housing having a round cylindrical shape with a wider portion and a narrow portion;

said wider portion having a receptacle therein shaped to cooperate with said tip of said cone; and, said narrow portion including said bore and said bore extending from said receptacle through said narrow portion.

3. The pressure device of claim 1 further comprising:

said insert having a generally hollow round cylindrical form, an inner chamber, a second chamber coaxial with said inner chamber and of greater diameter, a neck, and an opposite opening;

said insert receiving said housing through said opening and to said neck; and, said neck having a hexagonal nut adapted to receive a toolhead.

4. The pressure device of claim 1 further comprising: said assembly block having a hollow round cylinder with two opposite open ends;

one end having a flange thereon of greater width than the remainder of said assembly block and the opposite end having a neck;

said flange having an opening therein to receive said insert; and, said flange being adapted to connect to the barrel.

5. The pressure device of claim 1 wherein said variable screw pitch of said turning shaft decreases at said exit end thus increasing the pressure within said barrel proximate said exit end.

6. The pressure device of claim 1 wherein said turning shaft operatively connects to said exit cone and rotates said exit cone from about 100 revolutions per minute to about 500 revolutions per minute.

7. A pressure device for processing crop residues, said device having a hopper adapted to receive a feedstock of crop residue, said device comprising:

a barrel connecting to said hopper, said barrel having a hollow cylindrical interior, said interior having a plurality of spiral rifling thereon;

a turning shaft within said barrel, said turning shaft having a variable screw pitch, and said turning shaft adapted to convey the crop residue through said device;

an assembly connecting to the barrel, said assembly having a popper device placed therein, said popper device adapted to receive crop residue from the barrel, and said popper device is an exit nozzle;

said rifling of said barrel in communication with said popper device;

a connector for said assembly to said barrel;

said exit nozzle having an exit cone, an exit housing receiving said exit cone, and an external adjustment insert receiving said exit housing, and said assembly having an assembly block receiving said external adjustment insert, and wherein said exit cone, said external adjustment insert, and said exit housing assemble concentrically within said assembly block;

said external adjustment insert having an open end and an opposite neck having a nut thereon adapted to receive a tool head, and said external adjustment insert containing said exit housing and said exit cone therein;

said exit cone adapted to connect to an exit end of said turning shaft and having a base and an opposite tip and including indentations on said base proximate said exit end and said tip having a partial frusto-conical shape truncated axially as a partial chord;

said exit housing having an axial bore in off center alignment relative to said tip; and, wherein said exit cone blocks the crop residue from exiting the popper device for every half revolution of the turning shaft.

8. The pressure device of claim 7 further comprising:

said exit housing having a round cylindrical shape with a wider portion and a narrow portion;

said wider portion having a receptacle therein shaped to cooperate with said tip of said cone;

said narrow portion including said bore and said bore extending from said receptacle through said narrow portion;

said insert having a generally hollow round cylindrical form, an inner chamber, a second chamber coaxial with said inner chamber and of greater diameter than said inner chamber, a neck, and an opposite open end;

said insert receiving said housing through said open end into said neck, said neck having a hexagonal nut adapted to receive a toolhead; and, said assembly block having a hollow round cylinder with two opposite open ends, one end having a flange thereon of greater width than the remainder of said assembly block and the opposite end having a neck, said flange having an opening therein sized to receive said insert and said flange being adapted to connect to said barrel.

9. The pressure device of claim 7 wherein said variable screw pitch of said turning shaft decreases at said exit end thus increasing the pressure within said barrel proximate said exit end.

10. The pressure device of claim 7 wherein said turning shaft operatively connects to said exit cone and rotates said exit cone from about 100 revolutions per minute to about 500 revolutions per minute.

11. A pressure device processing crop residues into nutritional feed, the pressure device comprising a barrel connecting to a hopper, a turning shaft located within the barrel and with a variable screw pitch, and an assembly clamping to the barrel, wherein the improvement comprises:

a popper device placed within said assembly, said popper device receiving crop residue therein, and said popper device is an exit nozzle;

said exit nozzle having an exit cone, an exit housing receiving said exit cone, and an external adjustment insert receiving said exit housing, and said assembly having an assembly block receiving said external adjustment insert, and wherein said exit cone, said external adjustment insert, and said exit housing assemble concentrically within said assembly block;

said external adjustment insert having an open end and an opposite partially closed end having a nut thereon adapted to receive a tool head, and said external adjustment insert containing said exit housing and said exit cone therein;

said exit cone attaching to an exit end of said turning shaft and having a base and an opposite tip and including indentations on said base proximate said exit end and said tip having a frusto-conical shape cut axially as a partial chord, said exit housing having an axial bore in off center alignment relative to said tip, said axial bore terminating in an exit hole; and, wherein said exit cone blocks the crop residue from exiting at said exit hole for every half revolution of said turning shaft.

* * * * *